Patented Nov. 15, 1949

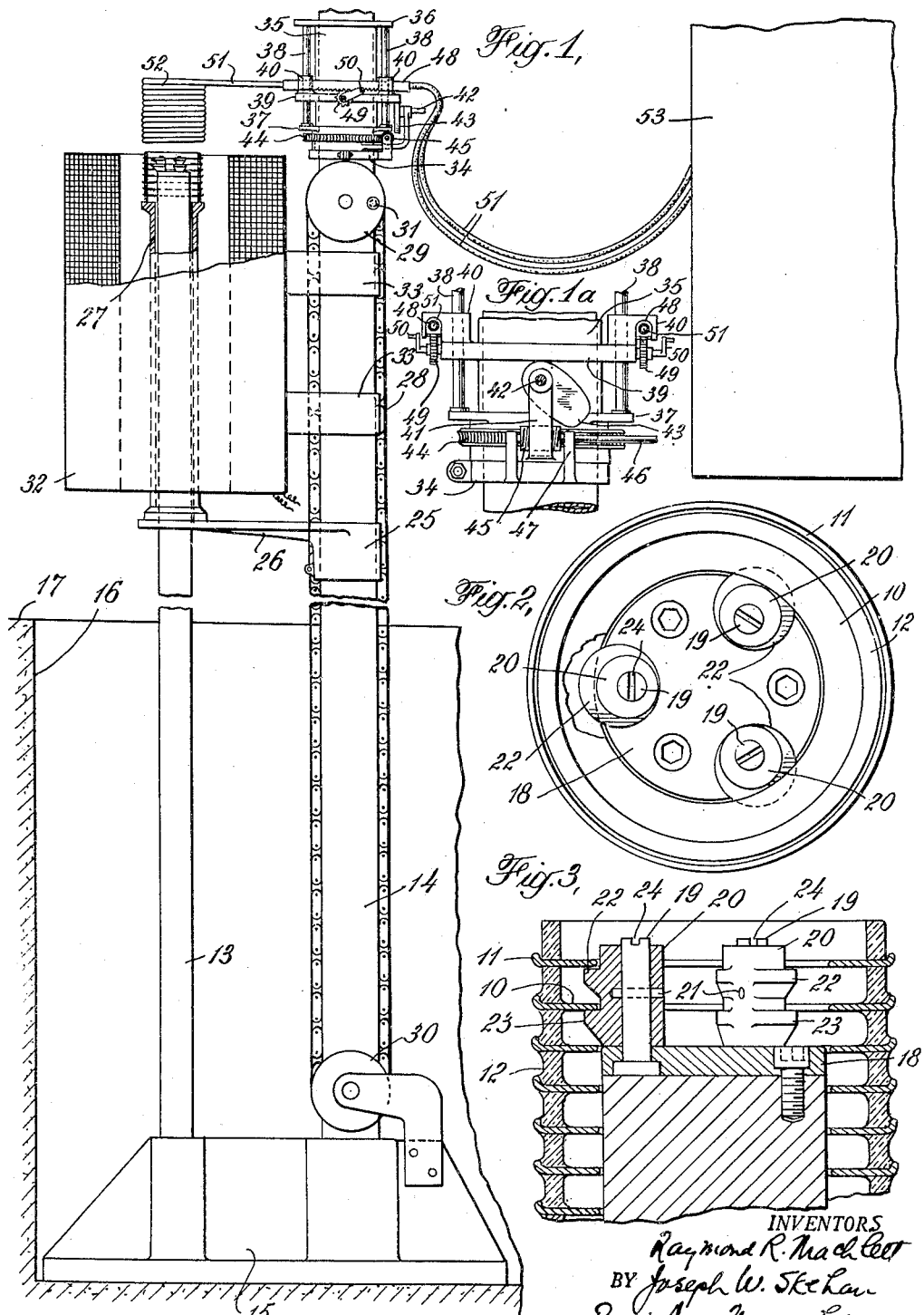

2,488,302

UNITED STATES PATENT OFFICE 2,488,302

APPARATUS FOR MAKING METAL-GLASS STRUCTURES

Raymond R. Machlett, New Canaan, and Joseph W. Skehan, Stamford, Conn., assignors to Machlett Laboratories Incorporated, Springdale, Conn., a corporation of Connecticut Application October 6, 1943, Serial No. 505,202

10 Claims. (Cl. 49—2)

This invention relates to the art of glass blowing as applied to the manufacture of structures which include metal elements or parts held in place by glass sealed thereto. More particularly, the invention has to do with a novel apparatus by the use of which such glass-metal structures can be made more accurately and at lower cost than by the apparatus heretofore employed for the purpose. In addition, the use of the apparatus of the invention makes readily possible the fabrication of certain glass-metal structures of desirable mechanical or electrical characteristics which either cannot be made or can be made only with great difficulty and at high cost, by the use of the apparatus heretofore available.

At the present time, many devices employed in various fields, such as electronics, are essentially glass-metal structures of the type mentioned, and in such devices, it is frequently of great importance to the proper functioning of the device that certain metal parts lie in exact spatial relationship. Examples of such devices include electron tubes, in which electrodes are mounted on stems sealed in glass at opposite ends of the envelope, and the insulating structure or column disclosed in our copending application, Serial No. 491,368, filed June 18, 1943, which has matured into Patent 2,376,439. The insulating structure referred to consists of alternate annular metallic discs and annular glass sections sealed to the discs. The discs are employed as a means for controlling the potential along the structure from one end to the other and it is, therefore, necessary that the discs be on a uniform spacing. Also, since the structure may be used as the envelope of an X-ray tube for extremely high tension with the discs used for focusing the electron beam, it is necessary that the discs be in exact axial alignment. As, in practical form, such an insulating structure may be several feet long and include more than 170 discs, the production of such a structure presents a serious problem.

Heretofore certain metal-glass structures have been made by operations in which the precision of alignment and spacing of the metal elements sealed in glass is largely determined by the skill of the glass blower and, while such a workman, after long experience, may attain a degree of manual dexterity sufficient for the production of some structures, his output is low and it decreases as the requirements to be fulfilled become more severe. Moreover, it is not possible for a glass blower of even the highest skill to produce acceptable devices of some kinds, as, for example, the insulating structure of our patent. Present methods for the production of glass-metal structures, therefore, leave much to be desired and, in fact, cannot be employed in the fabrication of certain of those structures.

The present invention is, accordingly, directed to the provision of a novel apparatus for making glass-metal structures by the use of which such structures can be produced efficiently and with the metal parts sealed in place in precise geometrical relation. The use of the new apparatus requires only a moderate degree of skill on the part of the workman. Also such a workman can be trained to operate the apparatus efficiently in a short time and such training does not require the development of a high degree of dexterity.

In the production of glass-metal structures by the use of the new apparatus, the metal elements to be held in the selected geometrical relation by glass sealed thereto are placed in contact with spaced surfaces on a piece of glass and, as so arranged, the elements are out of the desired final relation, in that the elements although in proper alignment are held too far separated by the glass. With the elements and glass so disposed, the assembly of parts is heated to cause the portions of the glass immediately in contact with the elements to become plastic and wet the elements. When those portions of the glass have become sufficiently heated and have wet the elements, the latter move relatively to one another until they take up the desired final relation, such movement resulting in deformation of the portions of the glass which lie closely adjacent the elements and have become plastic. As soon as the proper relation in space between the elements has been established, the heating is discontinued or reduced to permit the glass to set and, while the glass is setting, the elements are held firmly in place. Thereafter, the assembly is annealed to relieve the strains in the portions of the glass which seal the elements in position and after cooling, the structure is complete.

For a better understanding of the invention, reference may be made to the accompanying drawings in which Fig. 1 is a view in elevation, with parts in section, of one form of the new apparatus;

Fig. 1a is a view in elevation and at right angles to Fig. 1 of a part of the mechanism shown in the latter figure;

Fig. 2 is a plan view, with a part broken away, of a part of the apparatus; and

Fig. 3 is a vertical sectional view on an enlarged scale of a part of the apparatus;

The apparatus shown in the drawing is to be employed in the production of the insulating structure of our patent, which comprises annular metal discs 10 circumferentially strengthened against warping, as by being formed with dished outer edges 11, and alternate annular sections 12 of glass of suitable composition. In the completed structure, the discs are on a uniform spacing of three or more to the inch and in axial alignment and the glass sections are sealed to the opposed faces of the discs and hold them in place.

The new apparatus includes a pair of columns 13, 14 mounted in a base 15, and, as the columns are of considerable length and the workman operates at the upper ends of the columns, it is advantageous to mount the base in a pit 16 with the columns projecting up above the floor surface 17.

Mounted on the upper end of column 13 is a plate 18 through which project three headed studs 19. A generally cylindrical block 20 is secured on each stud by a pin 21 and each block is formed with upper and lower ledges 22, 23 projecting from its curved surface and lying one above the other. The ledges are of crescent shape and the distance between the tops of the ledges is the same as that between similar faces of adjacent discs 10 in the finished insulating structure. The studs 19 are placed in a circle 120° apart and the form and mounting of the blocks is such that, when the blocks are disposed with their ledges in their outermost positions, the surfaces of each block above its upper ledge and between its ledges lie approximately tangent to the inner surfaces of a cylinder of the same diameter as the opening through one of the discs 10. When each stud 19 with its block is rotated by 180°, the ledges on the block lie wholly within the cylinder referred to and the surfaces of the blocks then lying outermost are substantially tangent to the inner surface of the cylinder. When the ledges are in their outermost positions, the upper ledge on each block is adapted to serve as a stop and support and the lower ledge as a support. The surface of each block above the upper ledge and between the ledges is adapted to serve as centering and guiding means and the diametrically opposite surface of each block as a guide.

Mounted for sliding movement on column 14 is a sleeve 25 provided with an arm 26 on which may be supported a sleeve 27 mounted on column 13. Sleeve 25 is connected to a link of a chain 28 trained around a pulley 29 mounted on column 14 near its top and pulley 30 suitably mounted near the lower end of the column. Pulley 29 may be operated by a handle 31 mounted directly on the pulley or geared thereto, to move the chain to raise and lower the sleeve 25.

An annealing oven 32 is mounted on arms 33 on column 14 and may be placed to enclose the upper end of column 13. The oven walls contain electrical heating elements supplied with current in any suitable manner.

Above arms 33 on column 14 is a clamping ring 34 upon which rests a sleeve 35 provided with upper and lower flanges 36, 37 connected by rods 38. A frame 39 encircles the sleeve 35 and is provided with brackets 40 through which the posts 38 extend. The frame is adjustable vertically of rods 38 and, for this purpose, any conventional means, such as an adjustment screw (not shown) threaded through the frame and bearing against a fixed part of sleeve 35, may be employed. In the construction illustrated, sleeve 35 is provided with a vertical bracket 41 carrying a shaft 42 on which is mounted a cam 43 and by rotation of shaft 42, the cam may be employed to raise and lower frame 39, as desired.

The sleeve 35 is provided with a circumferential worm gear 44 at its lower end which meshes with the worm 45 on a shaft 46 mounted in brackets 47 on ring 34. By rotation of shaft 46, worm 45 causes rotation of gear 44 and sleeve 35 with its rod 38 and frame 39.

Mounted in brackets 40 on frame 39 are racks 48 operable by gears 49 on shafts mounted on frame 39, each shaft being provided with a hand crank 50. Extending through each rack and secured thereto is a tubular lead 51 of a high frequency induction coil 52, lead 51 extending from the coil to a source 53 of high frequency current. Coil 52 is preferably double and of approximately the same diameter as discs 10.

With the arrangement described, coil 52 may be shifted rectilinearly by endwise movement of racks 48 by gears 49 and cranks 50. Coil 52 may be shifted angularly by rotational movement of sleeve 35 effected by work gear 44 and worm wheel 45. Coil 52 may be raised and lowered by elevation or depression of frame 39 and, when cam 43 is employed, the raising and lowering of coil 52 may be in accordance with the cycle determined by the shape of cam 43.

In the use of the apparatus in the production of the insulating structure of our patent, the sleeve 25 is moved upward along column 14 to bring sleeve 27 on column 13 near the top of that column. The coil 52 is then moved away from the top of column 13, and with the blocks 20 in the position shown in Fig. 2, a metal disc is placed on top of ledges 22 of the blocks and a glass section 12 is placed on top of the disc. The disc is properly centered by the surfaces of the blocks above ledges 22 and the glass section is centered by the rim 11 on the disc. Coil 52 is then swung over the top of column 13 and its position adjusted until it is properly aligned with disc 10. The coil is then energized so that eddy currents are set up within the disc and the disc is heated to the proper temperature. In the course of such heating, the surface of the disc becomes oxidized and heat is conducted from the disc into the glass section through the area of the glass in direct contact with the metal. The heat causes the portion of the glass immediately adjacent the contacting areas of the glass and metal to melt and seal to the oxidized surface. During the heating operation, the heating effect of the coil may be regulated by varying the relation of the coil to the metal disc by vertical adjustment of the coil, as by means of cam 43.

After the first metal-glass seal has been made, blocks 20 are rotated and the disc with the glass section in place is permitted to move downward to a position such that when the blocks are again rotated to bring their ledges outward, the disc rests on the lower ledges 23. During the downward movement of the disc, it is guided by the surfaces of blocks 20. Another disc is then placed on top of the glass section and the second glass section placed on top of the disc. As the vertical distance between the upper surfaces of the ledges is equal to the desired spacing of the discs in the final structure and the glass sections used are a little longer than that spacing, the second disc, when resting on the first glass section, will initially be free of the top surfaces of ledges 22 of the blocks. The first and second discs are held in proper axial alignment by the surfaces of the blocks above upper ledges 22 and between the upper and lower ledges on the blocks. With the parts in this position, the coil is placed back over the top of the column and again energized to heat the upper disc and cause the portions of the glass sections in direct contact with it to seal to it on both its top and bottom surfaces at the same time. In the heating operation, that part of the glass in the first section immediately adjacent the under surface of the second disc will flow to permit that disc to move down under the influence of gravity, the disc being guided in such movement by the surfaces of the blocks 20 above their ledges 22. The second disc ultimately comes to rest on the top surfaces of ledges 22 of the blocks and, when the heating is discontinued or reduced sufficiently to permit the softened portions of the glass to set, the two discs will be sealed in place in proper axial alignment and at the spacing which it is desired that they shall have in the final structure.

After the sealing of the second disc to the two glass sections, the procedure described is repeated to add another disc and another section. At this stage, the first or lowest disc rests on top of sleeve 27 on arm 26 and, as the operation proceeds with successive discs and sections added, sleeve 25 is moved down column 14 and sleeve 27 on column 13 supports the assembly of discs and sections, although the ledges 23 on blocks 20 also help in supporting the uppermost sealed disc during a sealing operation. With the addition of discs and sections at the top of the assembly, the latter slowly progresses downward through the annealing oven 31 and the strains in the glass section are relieved by the annealing operation. When an insulating structure of the desired length has been completed and annealed, coil 52 is swung from over the top of column 13, blocks 20 are swung to place their ledges inward, and the structure is taken off the upper end of column 13.

As mentioned above, coil 52 is preferably a double coil having one helix within the other, so that the field produced by the two coils causes eddy current induction relatively uniformly over the surface of the disc being heated. By raising and lowering the coil, as by means of the cam, to vary the heating action, high and low heating effects can be obtained in a cycle and thereby distortion of the glass can be restricted to a minimum and the coil may be employed for annealing.

In the apparatus illustrated, the insulating structure being produced is supported vertically rather than horizontally and this arrangement is preferred in the production of structures of considerable length. If the column were supported horizontally, it would be considerably more difficult to obtain the desired space relation of the parts, but in the production of short structures, the parts can be supported to extend horizontaly.

In the production of the laminated insulating structure as above described, the first metal disc and the first glass section are first sealed together, after which the second disc is placed on top of the first section and the second section placed on top of the second disc. When the second disc is heated, the glass in both sections in immediate contact with the disc becomes softened and plastic so as to seal the sections to opposite faces of the disc. At the same time, the second disc moves downward under positive guidance until it reaches its desired final position with reference to the first disc. This procedure, which involves sealing the first section to the first disc in one operation and then sealing the ends of the first and second sections to opposite faces of the second disc in a second heating operation, is preferred, but if desired, the first and second discs could be sealed at the same time to opposite ends of the first section, although such an operation would require the use of a larger diameter coil.

We claim:

1. In apparatus for making metal-glass structures made up of open center metal discs separated by cylindrical glass sections sealed thereto, the combination of a column and a plurality of members mounted in concentric arrangement at the upper end of the column each member having upper and lower supporting surfaces adapted to engage the inner edges of said metal discs and spaced a distance equal to the desired spacing of the discs in the final structure.

2. In apparatus for making metal-glass structures made up of open center metal discs separated by cylindrical glass sections sealed thereto, the combination of a column, a plurality of members mounted at the upper end of the column, each member having upper and lower supporting surfaces adapted to engage the inner edges of said metal discs and spaced a distance equal to the desired spacing of the discs in the final structure, and means movable along the column below the upper end thereof for supporting a structure being assembled thereon, said members being movable to and from a position in which they lie wholly within a circle of the diameter of the openings through said discs.

3. Apparatus for use in the production of metalglass structures made up of metal elements secured to one another by intervening glass sections sealed thereto, which comprises a column, a plurality of members mounted in a circular series at the upper end of said column and having surfaces in upper and lower levels, said surfaces being adapted to engage portions of said elements and the distance between said levels being equal to the desired spacing of the elements in the finished structure, said members being movable to positions such that the elements may pass by said surfaces on the members and move down the column, a mounting adjacent the column, and heating means of said mounting operable to heat an element supported by said members.

4. Apparatus for use in making metal-glass structures made up of metal elements and intervening glass sections sealed thereto, which comprises a column, a plurality of members mounted in a circular series at the upper end of the column and having surfaces in upper and lower levels, said surfaces being adapted to engage said elements at edges thereof and said levels being spaced a distance equal to the desired spacing of the elements in the finished structure, said members being movable to positions such that the elements may pass by said surfaces on the members and move down the column, and a movable support on the column below said members for supporting elements which have passed the members.

5. Apparatus for use in making metal-glass structures made up of metal elements and intervening glass sections sealed thereto, which comprises a column, a plurality of members mounted at the upper end of the column and having surfaces in upper and lower levels, said surfaces being adapted to engage portions of said elements and the distance between said levels being equal to the desired spacing of the elements in the finished structure, said members being movable to positions such that an element previously supported by the members may pass along the members and move down the column, and a movable support on the column below the members for supporting elements which have passed the members.

6. Apparatus for use in making metal-glass structures made up of metal elements and intervening glass sections sealed thereto, which comprises a column, a plurality of members mounted at the upper end of the column and having surfaces in upper and lower levels, said surfaces being adapted to engage portions of said elements and the distance between said levels being equal to the desired spacing of the elements in the finished structure, said members being movable to positions such that an element previously supported by the members may pass along the members and move down the column, a mounting adjacent the column, heating means on said mounting operable to heat an element carried by said members, an oven enclosing the upper part of the column, and a movable support on the column below the members for supporting elements which have passed the members.

7. Apparatus for use in making metal-glass structures made up of open center metal discs and intervening cylindrical sections of glass between the discs and sealed thereto, which comprises a column, a plurality of members mounted at the upper end of the column in a circular series about the axis of the column, the members having surfaces in upper and lower levels adapted to engage edge portions of said discs, said levels being spaced a distance equal to the desired spacing of the elements in the finished structure, said members being movable to positions such that the discs and sections may pass by said surfaces and move down the column, a mounting adjacent the column, heating means on the mounting operable to heat a disc supported by said members, and a support movable lengthwise of the column below the members for supporting discs and sections which have passed the members.

8. Apparatus for use in making metal-glass structures made up of open center metal discs and intervening cylindrical sections of glass between the discs and sealed thereto, which comprises a column, a plurality of members mounted at the upper end of the column in a circular series about the axis of the column, the members having surfaces in upper and lower levels adapted to engage the inner edges of said discs, the column being of such cross-section as to pass through the openings through the discs and sections, and the levels being spaced a distance equal to the desired spacing of the discs in the finished structure, the members being movable to positions such that the discs and sections may pass said surfaces and move down the column, a mounting adjacent the column, and heating means on the mounting operable to heat elements on said surfaces.

9. Apparatus for use in making metal-glass structures made up of open center metal discs and intervening cylindrical sections of glass between the discs and sealed thereto, which comprises a column, a plurality of members mounted at the upper end of the column in a circular series about the axis of the column, the members having surfaces in upper and lower levels adapted to engage the inner edges of said discs, the column being of such cross-section as to pass through the openings through the discs and sections, and the levels being spaced a distance equal to the desired spacing of the discs in the finished structure, the members being movable to positions such that the discs and sections may pass said surfaces and move down the column, a mounting adjacent the column, heating means on the mounting operable to heat elements on said surfaces, and a support mounted on the column for lengthwise movement and adapted to support discs and sections which have passed said surfaces.

10. Apparatus for use in making metal-glass structures made up of open center metal discs and intervening cylindrical sections of glass between the discs and sealed thereto, which comprises a column, a plurality of members mounted at the upper end of the column in a circular series about the axis of the column, the members having surfaces in upper and lower levels adapted to engage the inner edges of said discs, the column being of such cross-section as to pass through the openings through the discs and sections, and the levels being spaced a distance equal to the desired spacing of the discs in the finished structure, the members being movable to positions such that the discs and sections may pass said surfaces and move down the column, a mounting adjacent the column, heating means on the mounting operable to heat elements on said surfaces, and a support mounted on the column for lengthwise movement and adapted to support discs and sections which have passed said surfaces.

RAYMOND R. MACHLETT.
JOSEPH W. SKEHAN.

REFERENCES CITED

The following references are of record in the file of this patent:

UNITED STATES PATENTS

| Number | Name | Date |
|---|---|---|
| 1,904,214 | Fagan | Apr. 18, 1933 |
| 2,048,556 | McArthur | July 21, 1936 |
| 2,121,627 | Donovan et al. | June 21, 1938 |
| 2,125,316 | Ronci | Aug. 2, 1938 |
| 2,191,951 | Blau | Feb. 27, 1940 |
| 2,290,050 | Hinkley et al. | July 14, 1942 |
| 2,296,347 | Hinkley et al. | Sept. 22, 1942 |
| 2,297,492 | Michaelis | Sept. 29, 1942 |
| 2,335,617 | Thomas et al. | Nov. 30, 1943 |
| 2,359,501 | White | Oct. 3, 1944 |
| 2,374,546 | Laico | Apr. 24, 1945 |